United States Patent [19]

Beni et al.

[11] 4,416,516

[45] Nov. 22, 1983

[54] MATRIX ADDRESSABLE ELECTROCHROMIC DEVICES

[75] Inventors: Gerardo Beni, Old Bridge; Lawrence M. Schiavone, Howell, both of N.J.

[73] Assignee: Bell Telephone Laboratories, Incorporated, Murray Hill, N.J.

[21] Appl. No.: 254,076

[22] Filed: Apr. 14, 1981

[51] Int. Cl.³ .................................................. G02F 1/17
[52] U.S. Cl. .................................................. 350/357
[58] Field of Search ..................................... 350/357

[56] References Cited

U.S. PATENT DOCUMENTS 4,191,453  3/1980  Beni et al. .................. 350/357
4,258,984  3/1981  Beni et al. .................. 350/357

FOREIGN PATENT DOCUMENTS 53-17355  2/1978  Japan ......................... 350/357

Primary Examiner—James W. Davie
Attorney, Agent, or Firm—Bruce S. Schneider

[57] ABSTRACT

Electrochromic devices utilizing an electrochromic iridium oxide electrode and a tantalum oxide counterelectrode exhibit a voltage threshold and short circuit memory. The short circuit memory and voltage threshold allow the use of these devices in matrix addressing schemes.

7 Claims, 1 Drawing Figure

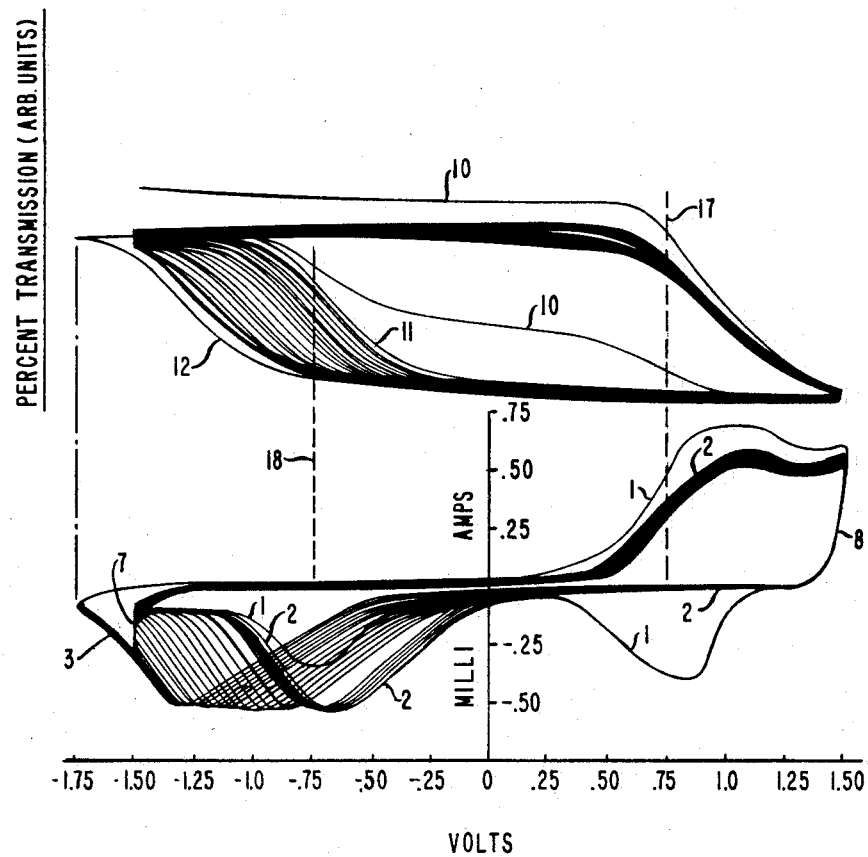

MATRIX ADDRESSABLE ELECTROCHROMIC DEVICES

BACKGROUND OF THE INVENTION

1. Field of the Invention

This invention relates to optical devices and, more particularly, to electrochromic devices.

2. Art Background

A variety of electrochromic devices have been proposed recently. Among these devices are those which utilize an electrochromic iridium oxide electrode together with a counterelectrode such as a platinum or an iridium oxide counterelectrode. In this iridium oxide device, the iridium oxide electrochromic electrode is grown, for example, by a vacuum deposition process such as sputtering or by a cyclic anodization process. The device is constructed by contacting the electrochromic electrode and the counterelectrode with a suitable electrolyte such as an aqueous sulfuric acid solution.

Electrochromic devices generally exhibit open circuit memory, i.e., the colored state of the electrochromic electrode persists even though the circuit between the electrochromic electrode and the counterelectrode is opened and no voltage is applied. (See, for example, A. R. Kmetz and S. K. Von Willisen, *Non Emissive Electro Optic Displays*, Plenum, New York, 1976.) Although open circuit memory is an important property, matrix addressing schemes used in display configurations also require a threshold coloration potential and a short circuit memory. (These properties should co-exist with a suitable response time, e.g., for many applications less than one second for coloration and bleaching.)

The presence of a threshold potential is determined by comparison to the two extreme voltages utilized in the operation of the device. The upper extreme voltage is that necessary to produce a desired optical density change upon coloration, the lower extreme typically is the voltage at which degradation, e.g., hydrolysis of an aqueous electrolyte, occurs. For threshold, the voltage at which charge exchange with the electrolyte begins should be larger than the lower extreme by one-half or more of the difference between the upper and lower extremes of the operating voltages. In many matrix addressing schemes a cell within a multi-element display device is colored by applying a voltage to the appropriate row and column of an array. The voltage applied in either the row or column is insufficient to color the device but the two voltages together induce coloration. To insure this additive effect is posible, the cell should have a coloration voltage threshold.

The second necessary property, short circuit memory, is the persistence of color after reduction of the applied potential below the coloration threshold while electrical continuity between the two electrodes is maintained. Because of the electronic configuration employed in matrix addressing matrix elements having battery characteristics, e.g., electrochromic cells are short circuited during operations involving the coloration of other cells within the matrix. If the elements do not have short circuit memory, parts of the displayed information in the array are lost during the operation necessary to display information at other portions of the array.

Since matrix addressing is a desirable approach to producing display systems, the development of an electrochromic device having such short circuit memory and threshold would be quite significant. However, an electrochromic device, in particular an iridium oxide based device with both short circuit memory and threshold, has not been disclosed.

SUMMARY OF THE INVENTION

The use of a tantalum oxide electrode in conjunction with an electrochromic iridium oxide electrode produces a device that has a short circuit memory, coloration threshold and response times of less than one second. In a preferred embodiment, the device is constructed by contacting the electrochromic iridium oxide electrode and the tantalum oxide electrode with a suitable electrolyte such as a 0.5 M aqueous $H_2SO_4$ solution. Such devices color by applying a voltage on the order of approximately +1.5 volts between the two electrodes. After coloration, the external voltage is reducible to essentially zero voltage by short circuiting the two electrodes and although the circuit remains closed, coloration substantially persists for periods of at least six minutes. Similarly, if the device is bleached by applying an appropriate voltage and then short circuited, the cell bleaching substantially persists for periods of at least six minutes.

BRIEF DESCRIPTION OF THE DRAWING

The FIGURE illustrates electrical and optical characteristics of a device within the subject invention.

DETAILED DESCRIPTION

The subject devices are based on the use of an electrochromic iridium oxide electrode in conjunction with a tantalum oxide counterelectrode. The type of electrochromic iridium oxide is not critical provided the electrode undergoes an optical change upon application of a suitable potential. For example, iridium oxide electrodes produced by cyclic anodization, as described by Gottesfeld et al, in *Applied Physics Letters*, 33, 208 (1978), or U.S. Pat. No. 4,191,453, issued Mar. 4, 1980, (which is hereby incorporated by reference) and vacuum deposited iridium oxide electrochromic electrodes as described in U.S. Pat. No. 4,258,984, issued Mar. 31, 1981, (which is hereby incorporated by reference) are appropriate. However, the use of other possible iridium oxide electrochromic electrodes is not precluded.

The depth of coloration of the electrochromic iridum oxide electrode determines the optical density change. Obviously, to have an approximately uniform optical density change across the entire electrode, the depth of coloration should be approximately equal across the entire electrode. Coloration or bleaching of a particular portion of the electrode is achieved by exchange of charged species between this portion and the electrolyte. Thus to color the electrode to a desired depth requires an amount of charge exchange determined by this depth and by the geometric area of the electrochromic electrode.

Optical density changes of at least 0.3 are desirable for most device applications. For electrochromic iridium oxide to obtain such an optical density, coloration to a depth of approximately 1000 Angstroms generally should be employed. To yield coloration to a depth of 1000 Angstroms a charge exchange of approximately 20 millicoulombs per $cm^2$ is typically required. For most applications geometric surface areas of the electrochromic iridium oxide electrode are in the range 0.01 $cm^2$ to 10 cm². Therefore, to produce a desirable color change in a typical electrochromic iridium oxide electrode, charge transfer between the electrode and electrolyte in the range 0.2 millicoulombs to 200 millicoulombs is employed.

The neutrality of the entire cell should be maintained during operation. To maintain neutrality, an amount of charge is exchanged at the counterelectrode that is essentially equivalent (but opposite in sign) to that exchanged at the electrochromic electrode. Thus, a counterelectrode that is capable of exchanging at least 0.2 millicoulombs is required to maintain charge neutrality and to allow desirable optical density changes. For the counterelectrodes of the subject invention, the charge exchange capacity is not strongly dependent on electrode thickness since most charge is stored on its surface. The smaller the effective area of the counterelectrode the greater the applied voltage require to store the desired charge. However, a voltage that causes the electrolyte to degrade, e.g., causes hydrolysis of water in an aqueous electrolyte, is undesirable. Thus, it is advantageous to maintain the voltage at levels which avoid this degradation potential, e.g., above the $H_2$ evolution potential for aqueous electrolytes. To exchange charges greater than 0.2 millicoulombs, counterelectrode effective areas, i.e., the surface area available for charge exchange with the electrolyte, greater than 10 cm² are employed. (This corresponds to a geometric area of approximately 1 cm².) However, counterelectrodes larger than 100 cm² are inconvenient for many applications because of their size. Additionally, the greater the area of the counterelectrode, the closer the extremes of the operating voltage. In fact, the use of a counterelectrode having a tremendously excessive geometric area produces operating extreme voltages that are so close that voltage threshold is not present. Therefore, it is generally desireable to limit the geometric area of the counterelectrode to less than 1.4 times the minimum area required to allow exchange of the quantity of charge necessary to allow the desired optical density change. If an electrochromic electrode requires a counterelectrode with geometric area greater than a size which is physically convenient, the area of the electrochromic electrode should be reduced.

The thickness of the iridium oxide electrode influences both the extent of optical change achievable (as previously discussed) and the resistance of the cell. Typically, cell resistances greater than 0.1 ohm are not appropriate since excessive power is necessary to operate the device. Additionally, optical density changes on the order of 0.3 to 0.6 are desirable to allow an easily perceivable change of color with a corresponding change in voltage. To achieve suitable optical density changes and allow practical resistances to be employed, thicknesses in the range 1000 Angstroms to 5000 Angstroms, preferably 1500 Angstroms to 3000 Angstroms, are generally utilized.

The counterelectrode employs an exposed surface that is substantially tantalum oxide. The surface of the counterelectrode should present a continuous layer of tantalum oxide that is at least one monolayer thick. (Under specific circumstances the entire surface of the electrode need not necessarily be tantalum oxide. These circumstances are that the non-tantalum oxide components (1) have a high resistivity to avoid substantially any electrical continuity to the counterelectrode substrate, and (2) do not electrically interact with the electrolyte to substantially change the properties of the cell.) Physical continuity is required to prevent contact of the electrolyte with the underlying substrate which degrades short circuit memory. Although significantly thicker layers of tantalum oxide are acceptable as the counterelectrode, layer thicknesses greater than 1 μm are generally not desirable since excessive cell resistance is typically produced. The geometric area of the counterelectrode should be large enough to allow storage of enough charge so that the desired optical density change as discussed above is produced in the electrochromic iridium oxide electrode for a desired applied voltage.

In a preferred embodiment, a suitably thick tantalum oxide counterelectrode is produced by a cyclic electrolytic process. In this process, a cell is formed between an electrochromic iridium oxide electrode, a tantalum metal electrode, e.g., a sheet of tantalum with an electrical contact such as a pressure contact, and an electrolyte such as an aqueous $H_2SO_4$ solution by contacting the two electrodes to the electrolyte. Cyclic voltammetry, as described by J. O'M Bockris and A. K. N. Reddy, in *Modern Electrochemistry*, Plenum 1970, is then performed on the cell. The cycling as shown in the Figure between the voltage levels denominated 7 and 8 on the voltammogram is continued. (These voltage levels are chosen to be just below the level of electrolyte degradation e.g., hydrogen and oxygen evolution, respectively, at the two extremes in an aqueous electrolyte.) Typically, the cycling produces voltammograms as shown by 1, 2, and 3 in the Figure where 1 and 2 indicate the first and second cycles and where 3 indicates the last cycle. The cycling is continued until the shape of the I-V curve obtained is invariant. At this point, a curve with shape as shown in the Figure and denoted 3 is typically obtained. By employing this process, a counterelectrode having a tantalum oxide thickness of suitable magnitude is produced. (In this growth process, if the specific type of electrochromic iridium oxide electrode and the specific composition of electrolyte that is ultimately to be used is employed, the counterelectrode is particularly well matched for its final application.)

In operation, a device is constructed by making a suitable electrical contact to the iridium oxide electrochromic electrode by conventional techniques such as indium solder. Similarly, electrical contact is made to the tantalum oxide counterelectrode by conventional techniques such as a pressure contact. The two electrodes are then contacted to an electrolyte. The particular electrolyte employed is not critical. However, it is generally desirable to utilize a protic electrolyte which does not cause substantial degradation of the electrochromic iridium oxide electrode. Exemplary electrolytes are aqueous electrolytes such as 0.5 M aqueous $H_2SO_4$ for sputtered iridium oxide electrodes and 0.5 M aqueous $Na_2SO_4$ adjusted to pH3.5 for electrodes produced by cyclic anodization. The electrodes are contacted with the electrolyte by conventional techniques such as by direct contact to a solid electrolyte or immersion in a liquid electrolyte. The voltage is increased until the desired optical density change is observed. (The lines 10, 11 and 12 indicate the transmission of the device versus voltage during the cycles denoted 1, 2 and 3, respectively. Thus, the transmission versus voltage curve for the final device is denoted by 12.) It is then possible to reduce the voltage to any voltage in the range between the voltages indicated by 17 and 18, i.e., the voltages in the Figure where optical density changes initiate. Since the cell has a short circuit memory even though this reduced voltage is inadequate to produce the desired initial coloration, the optical density of the electrochromic iridium oxide electrode does not substantially diminish in the short circuit condition for extended periods, i.e., periods generally greater than six minutes. To produce a bleaching of the device, the voltage is reduced to below the level indicated by 18. Since short circuit memory with voltage threshold is produced, the device as shown is useful in a matrix addressing system such as that described by G. Beni, *Journal of the Electrochemical Society*, 127, 467C (1980). The following example is illustrative of the conditions employed to produce such a device and its operation.

EXAMPLE

An electrochromic iridium oxide electrode was fabricated as described in U.S. Pat. No. 4,258,984, issued Mar. 31, 1981, by a sputtering technique. A tin oxide coated glass plate was used as a deposition substrate. A 15 mil thick, 3-inch in diameter iridium sheet was used as a sputtering target. Before initiating the sputtering, an atmosphere of 3 $\mu$m of oxygen was introduced into the chamber. Sputtering was induced by application of 15 watts of r.f. power at 750 volts to the target. The sputtering in the oxygen atmosphere was continued for approximately one hour to produce an iridium oxide layer approximately 1000 Angstroms thick.

Approximately 0.04 cm$^2$ of the sputtered iridium oxide was then electrically isolated. Electrical connection to the tin oxide portion of the electrode which, in turn, was electrically connected to the sputtered iridium oxide was made by using indium solder to produce a raised bar. A pressure clip was then attached to the bar. The entire electrode, except the isolated iridium oxide portion, was insulated by covering it with a coating of lacquer.

A device was formed by immersing the electrochromic iridium oxide electrode and a tantalum electrode into 0.5 M sulfuric acid. The tantalum electrode was made by cutting a paddle shape from a 5 mil thick sheet of tantalum. The wide portion of the paddle had dimensions of 2 cm by 1½ cm, and the handle of the paddle was ½ cm wide and approximately 2 cm long. A pressure contact was made to the handle portion of the paddle, and the paddle was immersed up to the handle in the electrolyte.

The cell was cycled between $-1.5$ volts and $+1.5$ volts at a rate of 100 millivolts per second. This cycling between 1.5 volt extremes was continued for approximately 20 cycles. After this cycling, the lower extreme of the cycle was decreased to $-1.75$. The cycling at the new extreme was continued for approximately three cycles. (Initially, the cycling was limited to $-1.5$ volts since before the tantalum oxide film was completely formed hydrogen evolution would have occurred at the lower $-1.75$ volt level.)

The final I-V curve and transmission curve obtained are shown in the Figure. The optical density changes shown in the Figure were obtainable at response rates up to approximately 200 milliseconds. This response rate was limited essentially by the conductivity of the tin oxide substrate.

What is claimed is:

1. A display comprising a plurality of elements and means for selectively changing the optical properties of said elements wherein said elements comprise an electrochromic electrode, an electrolyte, and a counterelectrode wherein a surface of a region of said electrochromic electrode and a surface of a region of said counterelectrode contact said electrolyte characterized in that said electrochromic electrode comprises electrochromic iridium oxide and said surface of said region of said counterelectrode contacting said electrolyte is essentially devoid of compositions other than tantalum oxide and high resistivity materials.

2. The display of claim 1 wherein said tantalum oxide comprises the surface of a tantalum substrate.

3. The display of either claim 1 or 2 wherein said electrolyte comprises an aqueous solution of sulfuric acid.

4. The display of either claim 1 or 2 wherein said electrolyte comprises an aqueous Na$_2$SO$_4$ solution.

5. The display of claim 1 wherein said electrochromic electrode is formed by a vacuum deposition technique.

6. The display of claim 1 wherein said electrochromic electrode is formed by a cyclic anodization technique.

7. The display of claim 1 wherein said means for changing the optical properties comprise electrical contacts to said electrochromic electrode and said counterelectrode.

* * * * *